US011964778B2

(12) United States Patent
Zhou

(10) Patent No.: US 11,964,778 B2
(45) Date of Patent: Apr. 23, 2024

(54) APPARATUS FOR RECEIVING AND SENDING PARCEL BY DRONE

(71) Applicant: Pengyue Zhou, Guangdong (CN)

(72) Inventor: Pengyue Zhou, Guangdong (CN)

( * ) Notice: Subject to any disclaimer, the term of this patent is extended or adjusted under 35 U.S.C. 154(b) by 744 days.

(21) Appl. No.: 16/803,693

(22) Filed: Feb. 27, 2020

(65) Prior Publication Data

US 2020/0198803 A1    Jun. 25, 2020

Related U.S. Application Data

(63) Continuation of application No. PCT/CN2018/102484, filed on Aug. 27, 2018.

(30) Foreign Application Priority Data

Aug. 31, 2017 (CN) .......................... 201710775137.8

(51) Int. Cl.
| | | |
|---|---|---|
| *B64F 1/32* | (2006.01) | |
| *B64C 39/02* | (2023.01) | |
| *B64F 1/18* | (2006.01) | |
| *B64U 10/13* | (2023.01) | |
| *B64U 101/60* | (2023.01) | |

(Continued)

(52) U.S. Cl.
CPC .............. *B64F 1/32* (2013.01); *B64C 39/024* (2013.01); *B64F 1/18* (2013.01); *B66F 7/065* (2013.01); *E01F 3/00* (2013.01); *B64U 10/13* (2023.01); *B64U 2101/60* (2023.01)

(58) Field of Classification Search
CPC ...... B64F 1/32; B64F 1/18; B64F 1/26; B64F 1/36; B64F 1/007; E01F 3/00
See application file for complete search history.

(56) References Cited

U.S. PATENT DOCUMENTS

| | | | | |
|---|---|---|---|---|
| 3,687,321 A | * | 8/1972 | Goodhart ................. | B64F 1/32 |
| | | | | 182/69.5 |
| 5,927,664 A | * | 7/1999 | Schmidt ................. | F16M 11/28 |
| | | | | 248/176.1 |

(Continued)

FOREIGN PATENT DOCUMENTS

| | | |
|---|---|---|
| CN | 105701636 A | 6/2016 |
| CN | 205396552 U | 7/2016 |

(Continued)

OTHER PUBLICATIONS

The State Intellectual Property Office of People's Republic of China, Chinese application No. 201710775137.8 First Office Action, dated Mar. 6, 2019, 35 total pages.

(Continued)

*Primary Examiner* — Tien Q Dinh
*Assistant Examiner* — William L Gmoser

(57) ABSTRACT

Disclosed is a system for receiving and sending goods delivered by a drone, including a base assembly and a barrier assembly. The base assembly comprises a platform capable of being arranged on a building, the platform is provided with a working surface; an operating area used for a drone to land and for goods to be placed is arranged on the working surface. The barrier assembly comprises a movable barrier plate. When the drone needs to land to the operating area, the barrier plate moves to a position between the building and the operating area, enabling the barrier assembly to separate the drone and a user.

20 Claims, 14 Drawing Sheets

(51) Int. Cl.
*B66F 7/06* (2006.01)
*E01F 3/00* (2006.01)

(56) References Cited

U.S. PATENT DOCUMENTS

| | | | | |
|---|---|---|---|---|
| 6,715,819 | B2 * | 4/2004 | Weissmueller | B60J 7/205 |
| | | | | 296/76 |
| 10,501,205 | B1 * | 12/2019 | Siewert | B64F 1/32 |
| 2015/0158599 | A1 * | 6/2015 | Sisko | B64F 1/20 |
| | | | | 244/114 R |
| 2016/0068277 | A1 | 3/2016 | Manitta | |
| 2019/0039751 | A1 * | 2/2019 | Janssen | B64C 39/024 |
| 2019/0367185 | A1 * | 12/2019 | Zambelli | B64F 1/00 |

FOREIGN PATENT DOCUMENTS

| | | | |
|---|---|---|---|
| CN | 105825652 A | 8/2016 | |
| CN | 205675246 U | 11/2016 | |
| CN | 106275447 A | 1/2017 | |
| CN | 205971863 U | 2/2017 | |
| CN | 206087328 U | 4/2017 | |
| CN | 206166555 U | 5/2017 | |
| CN | 107697304 A | 2/2018 | |
| CN | 207227977 U | 4/2018 | |
| KR | 101527210 B1 * | 6/2015 | ............... B64F 1/18 |
| WO | 2015117216 A1 | 8/2015 | |
| WO | 2017034278 A1 | 3/2017 | |
| WO | 2019042245 A1 | 3/2019 | |

OTHER PUBLICATIONS

World Intellectual Property Organization, International Search Report for Application No. PCT/CN/2018/102484, dated Nov. 28, 2018, 6 total pages.

* cited by examiner

APPARATUS FOR RECEIVING AND SENDING PARCEL BY DRONE

CROSS REFERENCE TO RELATED APPLICATIONS

The present disclosure is a continuation application of the international application No. PCT/CN2018/102484 filed Aug. 27, 2018, which claims priority from the Chinese patent application No. 201710775137.8, entitled "a system for receiving and sending goods delivered by drone and method for receiving and sending goods", filed Aug. 31, 2017, the entire content of which are hereby incorporated by reference.

TECHNICAL FIELD

The present disclosure relates to a system for receiving and sending goods delivered by drone.

BACKGROUND

Drone delivery is becoming more practical for express industry. In order to help user receiving and sending goods delivered by drone, one existent method is installing a fixed platform used for the drone to land/takeoff outside a balcony or below a windowsill of a building. However, during takeoff/landing of the drone, there is a chance of physical contact between user and drone, which will cause potential safety hazard.

SUMMARY

As such, the present disclosure proposes a relatively safe system for receiving and sending goods delivered by drone.

A system for receiving and sending goods delivered by drone is provided, which includes: a base assembly and a barrier assembly. The base assembly comprises a platform capable of being arranged on a building, the platform is provided with a working surface, an operating area used for a drone to land and for goods to be placed is arranged on the working surface. The barrier assembly comprises a movable barrier plate. When the drone needs to land to the operating area, the barrier plate moves to a position between the building and the operating area, enabling the barrier assembly to separate the operating area from the other side of the barrier plate where the user stays.

BRIEF DESCRIPTION OF DRAWINGS

To better explain the embodiments of the present disclosure or the technical solutions of the prior art, the following will briefly introduce the drawings involved in the description of the embodiments or the prior art.

DETAILED DESCRIPTION OF THE EMBODIMENTS

For better appreciation of the present disclosure, relevant drawings are referred to with the present disclosure described hereinafter.

Figure 1:
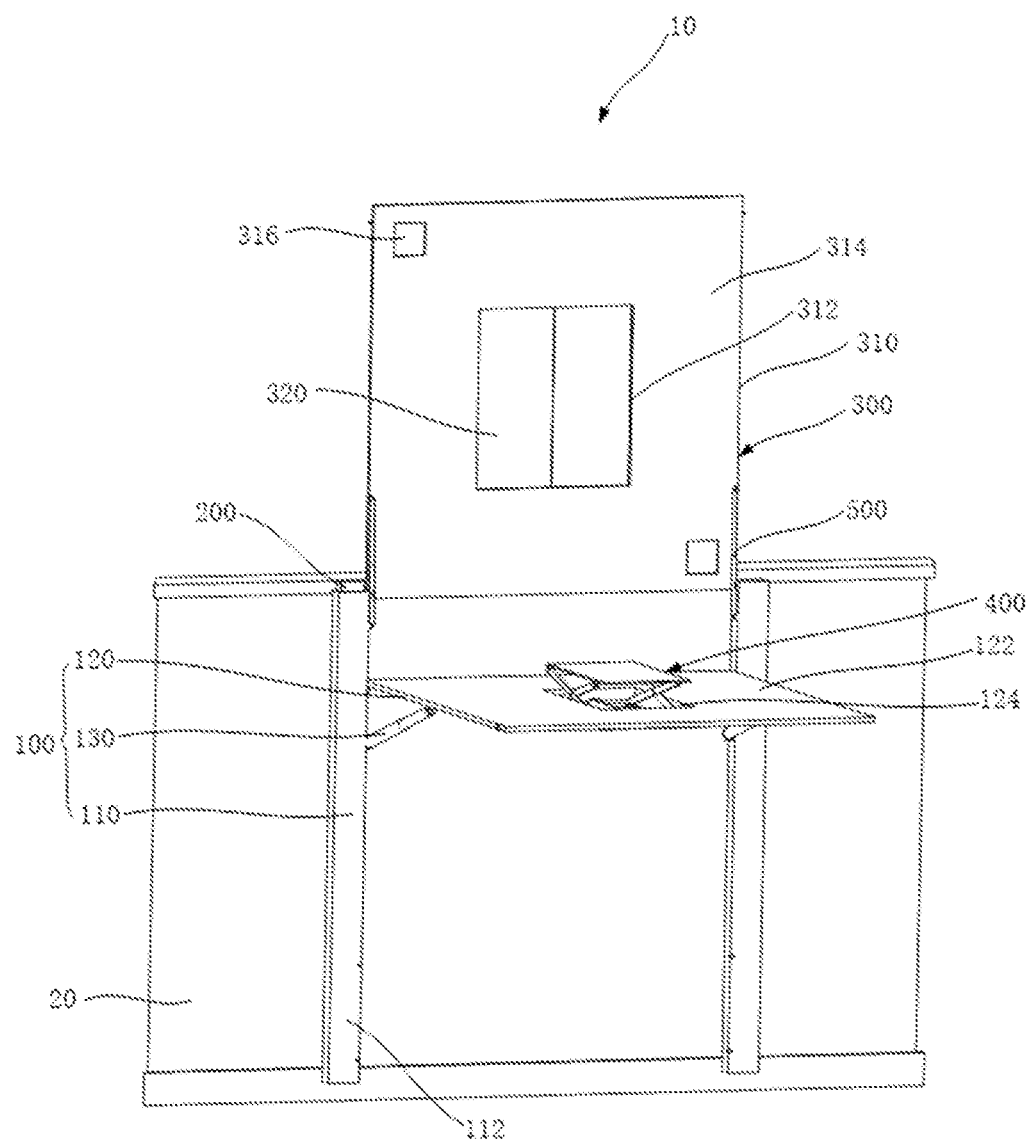
FIG. 1 is a schematic structural diagram of a system for receiving and sending goods delivered by drone, when the system is arranged on a building and is in fully deployed state, according to an embodiment.

As shown in FIG. 1, the system 10 for receiving and sending goods delivered by drone is used for temporary storage of the express goods, so that, the drone offloads the goods on the system 10, then the user picks up the goods, alternatively, the user places the goods on the system 10, then the drone loads the goods. The system 10 is capable of being arranged on exterior of a building 20, for example, the system 10 may be arranged on exterior side of a balcony railing or below a windowsill. The system 10 comprises a base assembly 100, an electronic control component 200, a barrier assembly 300 and a lift mechanism 400.

The base assembly 100 may be mounted on the building 20. The base assembly 100 is configured as a supporting structure of the system 10, also, the base assembly 100 is used for drone to land and is used for goods to be placed. The base assembly 100 includes a bracket 110 and a platform 120.

The bracket 110 is capable of being mounted on the building 20, and is configured to be a supporting component of the system 10, enabling the system 10 to be mounted on the building 20. In the illustrated embodiment, the bracket 110 includes two spaced and paralleled mounting bars 112, both of which can be mounted on the building 20.

The platform 120 is arranged on the bracket 110. The platform 120 is provided with a working surface 122, an operating area for drone to land and for the goods to be placed is arranged on the working surface 122. Specifically, in the illustrated embodiment, the platform 120 is substantially square plate-shaped.

Figure 2:
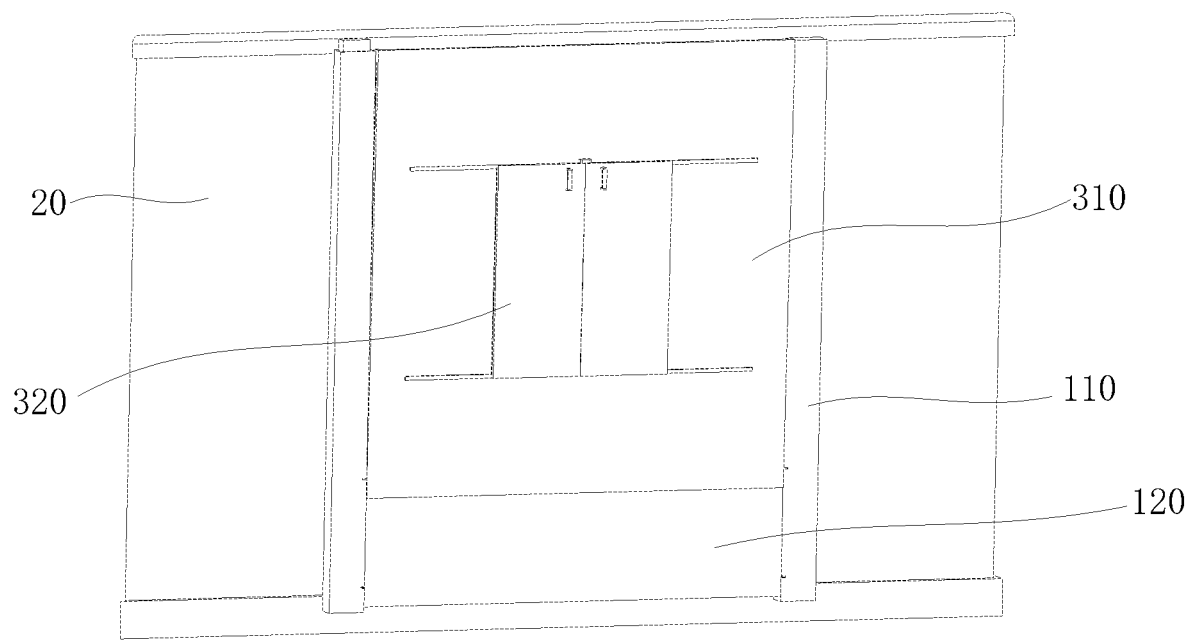
FIG. 2 is a schematic structural diagram of the system shown in FIG. 1, when the system is arranged on a building and is in standby state.

Please refer to FIG. 2. Specifically, the platform 120 is rotatably connected with the bracket 110. The platform 120 is capable of rotating to enable the working surface 122 to be horizontal, so that the operating area can serve for the drone to land and for the goods to be placed. The platform 120 is also capable of rotating to enable the working surface 122 to be vertical or tilted, so that when the system 10 is in standby state, the platform 120 may closely approach the building 20.

Specifically, one end of the platform 120 is rotatably connected with the bracket 110. The base assembly 100 further includes an actuator 130 for driving rotation of platform 120, which is a telescopic rod, two ends of the actuator 130 are rotatably connected with the bracket 110 and middle of the platform 120 respectively. The actuator is extendable, so as to drive the platform 120 to rotate. In the illustrated embodiment, one end of the platform 120 is rotatably connected with both of the mounting bars 112.

Specifically, the actuator 130 is a telescopic hydraulic cylinder or a motorized linear actuator. The actuator 130 is not limited to being a telescopic rod, for example, the platform 120 may be rotatably connected with the bracket 110 via a pivot, the actuator 130 may be a stepping motor, and the actuator 130 is connected with the pivot in a transmission way so as to drive rotation of platform 120.

The bracket 110 is not limited to being mounting bars 112, for example, the bracket 110 may be a plate-like structure, or the like.

The electronic control component 200 is configured to control operation of the system 10. Wherein, the electronic control component 200 is capable of receiving control signal from drone or from a UE (User Equipment) such as a mobile phone or a computer. Besides, the electronic control component 200 can transmit feedback signal to drone, so that the drone can land, offload/load the goods according to the feedback signal received; alternatively, the electronic control component 200 can transmit feedback signal to the UE, so that the user can place the goods according to the feedback signal received. In the illustrated embodiment, the electronic control component 200 can be arranged on one of the mounting bars 112. It can be understood that the electronic control component 200 is not limited to being arranged on the bracket 110, for example, the electronic control component may be arranged on the platform 120, or the building 20, or the like.

Figure 3:
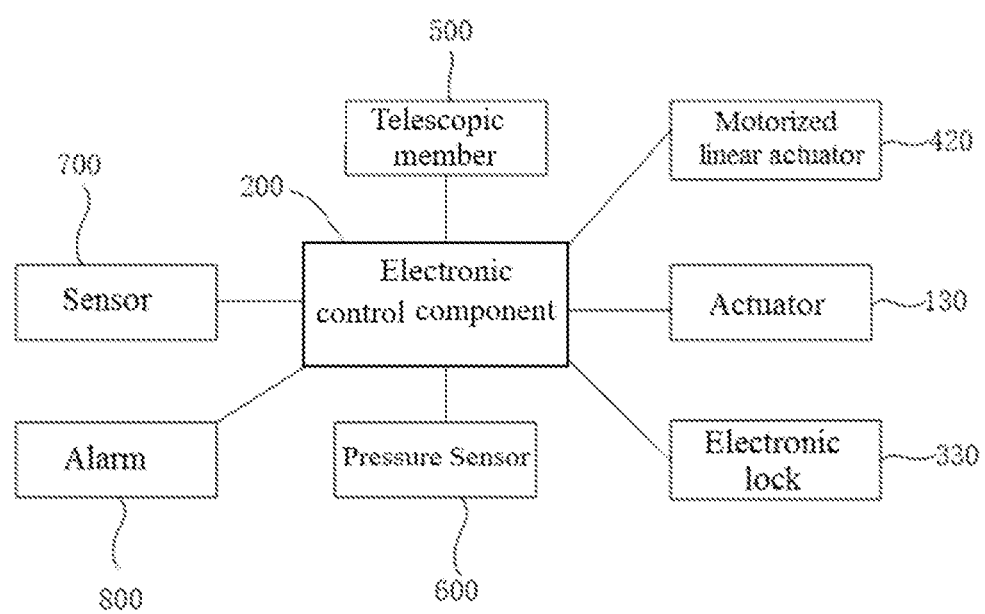
FIG. 3 is an electrical connection diagram of the system shown in FIG. 1.

Please refer to FIG. 3, the electronic control component 200 is electrically connected with the actuator 130, and is capable of controlling operation of the actuator 130.

Figure 4:
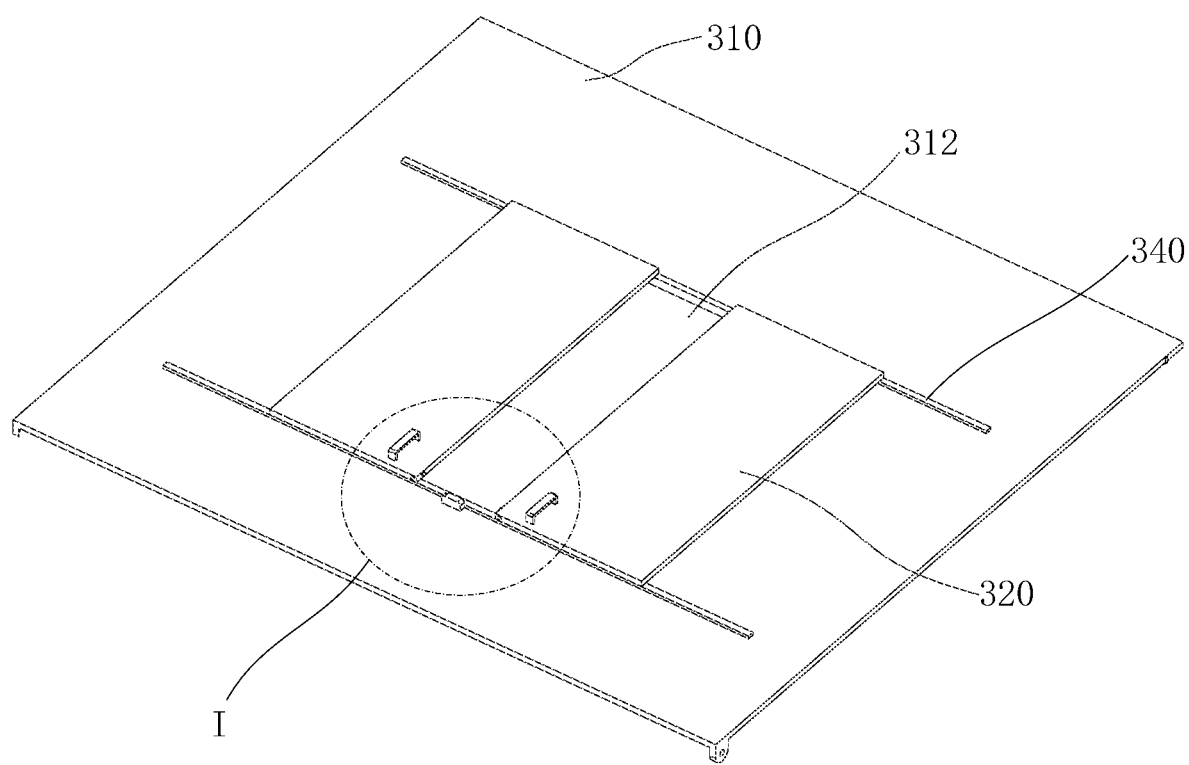
FIG. 4 is a schematic structural diagram of the barrier assembly of the system in FIG. 1 from another perspective.

Please refer to FIG. 4, when the working surface 122 is horizontal, the barrier assembly 300 is capable of being positioned close to the edge of the working surface 122, and being at least partially above the working surface 122, enabling the barrier assembly 300 to separate the operating area from the other side of the barrier assembly 300 away from the operating area. Wherein, the height of the portion of the barrier assembly 300 above the working surface 122 is greater than or equal to a distance from a rotor of the drone to the working surface 122.

Please refer to FIG. 4, the barrier assembly 300 includes a barrier plate 310. When the working surface 122 is horizontal, the barrier plate 310 is capable of being in a position close to the edge of the working surface 122, in which at least part of the barrier plate 310 is above the working surface 122, that is, the barrier plate 310 is positioned between the building 20 and the operating area. Wherein, the height of the portion of the barrier plate 310 above the working surface 122 is greater or equal to the distance from the rotor of the drone to the working surface 122.

An access opening 312 is formed in the barrier plate 310, allowing user to pick up or to place the goods when user stays at the other side of the barrier plate 310 away from the operating area. Specifically, the barrier plate 310 is substantially square plate shaped, and is provided with two opposite surfaces. A barrier surface 314 is one of the two opposite surface of the barrier plate 310 which is closer to the operating area. The access opening 312 penetrates through the two opposite surfaces.

The barrier assembly 300 further includes a door 320 movably arranged on the barrier plate 310. The door 320 can block the access opening 312. The barrier plate 310 and the door 320 can jointly separate the operating area from the other side of the barrier plate 310 away from the operating area, thus separating the user and the drone. In the illustrated embodiment, two doors 320 are provided, and are both movably arranged on the barrier plate 310, so as to jointly block the opening 312.

Figure 5:
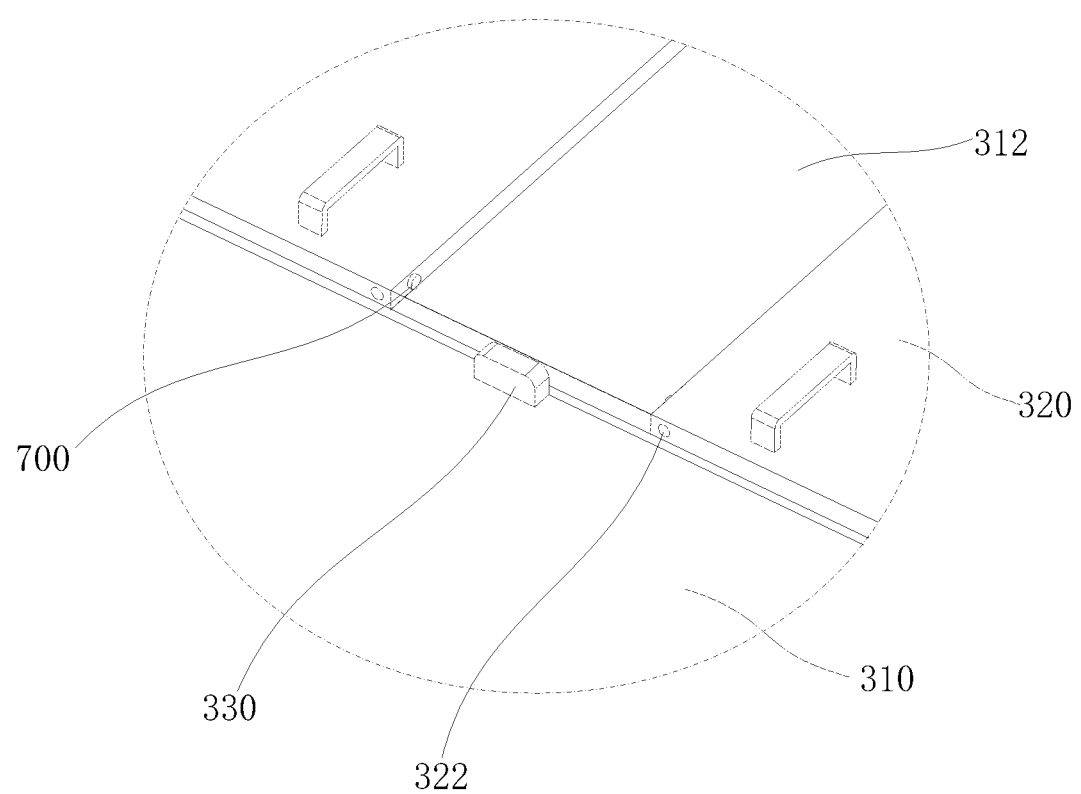
FIG. 5 is an enlarged view illustrating part I of the barrier assembly shown in FIG. 4.

Please refer to FIG. 5, the two doors 320 are each provided with a locking hole 322, correspondingly, the barrier plate 310 is provided with an electric lock 330. The electric lock 330 can be inserted into the locking holes 322 of the two doors 320 so as to lock the doors 320. Wherein, the electronic control component 200 is electrically connected with the electric lock 330, and is capable of controlling the electric lock 330 to unlock the doors 320, so that the user can open the doors 320, that is, the electric lock 330 keeps the doors 320 closed when not receiving control signal of the electronic control component 200.

The barrier assembly 300 further includes a slide rail 340 mounted on the barrier plate 310. The door 320 is arranged on the slide rail 340 and is slidable along the slide rail 340. The door 320 can be opened or closed by sliding along the slide rail 340.

It can be appreciated, to realize that the door 320 is opened or closed, the moving method of the door 320 is not limited to sliding along the slide rail 340. For example, the door 320 is rotatably connected with the barrier plate 310. The number of the door 320 is not limited to two, for example, only one door 320 is provided. Furthermore, when a hand is over the barrier plate 310, the door 320 can be opened automatically with a sensing function, that is, the door 320 is further provided with an actuator and a human body sensing device such as an infrared sensor or an ultrasonic sensor.

Figure 6:
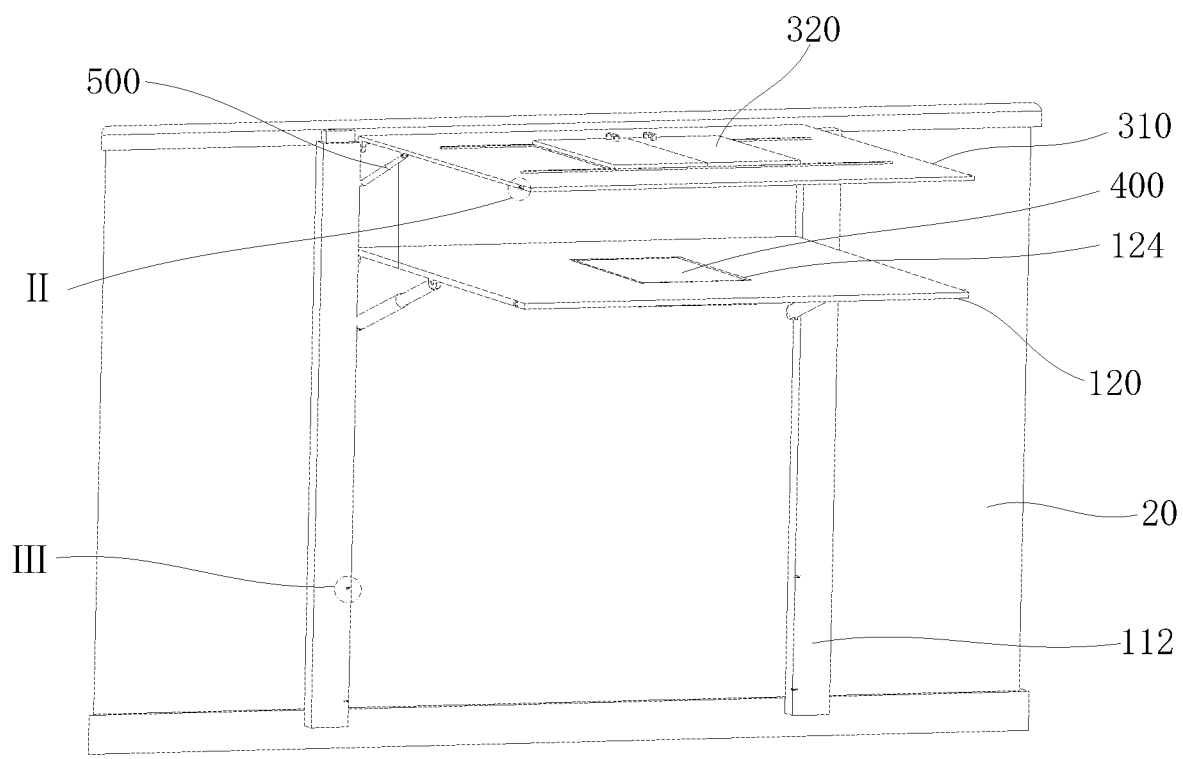
FIG. 6 is a schematic structural diagram of the system shown in FIG. 1, when the system is in semi deployed state.

Please refer to FIG. 6, further, the barrier plate 310 is movable, so that the barrier plate 310 is capable of moving to the position close to the edge of horizontal working surface 122, in which at least part of the barrier plate 310 is above the working surface 122, enabling drone to land to the operating area. The barrier plate 310 can also move to a position right above the operating area, in which the barrier plate 310 is opposite to and is spaced from the horizontal working surface 122, enabling the barrier plate 310 and the door 320 to jointly shelter the operating area, in order to prevent the goods in operating area from being rained and to prevent drone from landing to the operating area. When the barrier plate 310 is in the position close to the edge of the horizontal working surface 122, the barrier plate is vertical or tilted, and is positioned between the building 20 and the operating area, thus making the operating area exposed and enabling the drone to land to the operating area. When the barrier plate 310 is in the position right above the operating area, the barrier surface 314 is paralleled to the working surface 122.

An operation method of the barrier plate 310 is described as below. Before drone land to the operating area, the barrier plate 310 automatically moves to the position close to the edge of the working surface 122, in which the barrier plate 310 is between the building 20 and the operating area, enabling the barrier assembly 300 to separate the operating area from the other side of the barrier plate 310 away from the operating area. In one implementation, when the drone needs to land, the drone sends signal, the electronic control component 200 controls the barrier plate 310 to move to the position in which the barrier plate 310 is between the building 20 and the operating area according to the signal. After drone offloads the goods and flies away from the operating area, or before user places goods in the operating area, the barrier plate 310 automatically moves to the position right above the operating area, as shown in FIG. 6, so that the user can pick up or place the goods.

In the illustrated embodiment, the barrier plate 310 can rotate, so that the barrier plate 310 can be positioned close to the edge of the working surface 122 and can be positioned right above the operating area. One end of the barrier plate 310 is a connecting end, and the other end of the barrier plate 310 is a free end. The connecting end of the barrier plate 310 is rotatably connected with the bracket 110. By rotation of barrier plate 310, the free end can be positioned higher than the connecting end, so that the barrier plate 310 and the door 320 jointly separates the operating area from the other side of the barrier plate 310 away from the operating area.

Further, when the working surface 122 is vertical or tilted, the connecting end of the barrier plate 310 may be higher than the free end of the barrier plate 310 by rotation of the barrier plate 310, allowing the barrier plate 310 to closely approach the platform 120. That is, when the system 10 is in standby state as shown in FIG. 2, the barrier plate 310 closely approaches the platform 120, and the platform 120 closely approaches the building 20, resulting in the platform 120 being between the barrier plate 310 and the building 20.

Figure 7:
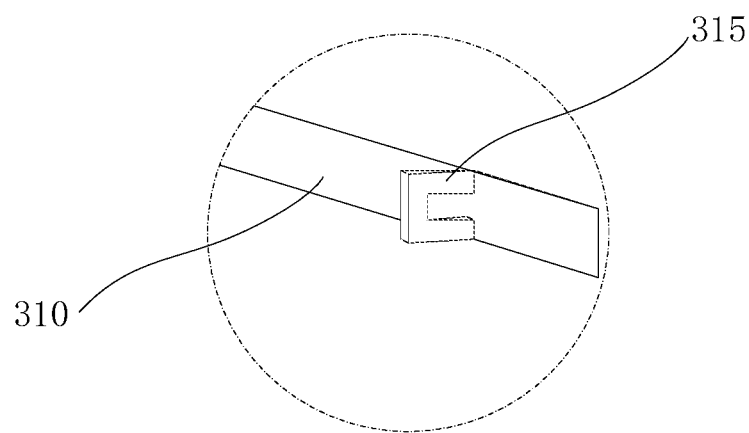
FIG. 7 is an enlarged view illustrating part II of the system shown in FIG. 6.
Figure 8:
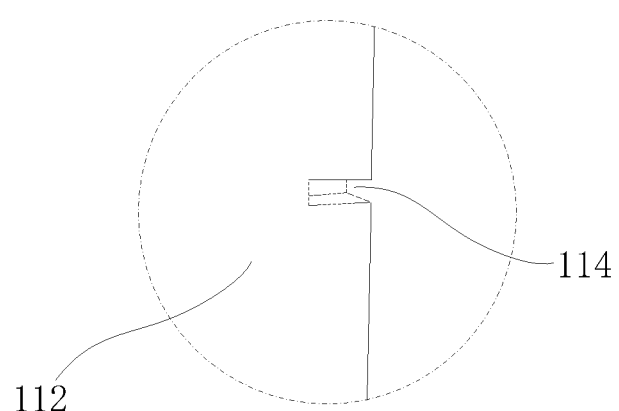
FIG. 8 is an enlarged view illustrating part III of the system shown in FIG. 6.

Please refer to FIG. 7 and FIG. 8, the free end of the barrier plate 310 is provided with a snap 315. The bracket 110 is provided with a clamp 114. The barrier plate 310 rotates to make the connecting end higher than the free end, thus enabling the clamp 114 and the snap 315 to snap fit, so as to stop the barrier plate 310 from rotation. It can be understood that, when the clamp 114 and the snap 315 snap fit, as the platform 120 is between the barrier plate 310 and the building 20, the barrier plate 310 may prevent the platform 120 from rotating away from the building 20.

The system 10 further includes a telescopic member 500 used for driving rotation of the barrier plate 310, two ends of the telescopic member 500 are rotatably connected with the bracket 110 and middle of the barrier plate 310 respectively, the telescopic member 500 is extendable so as to drive the barrier plate 310 to rotate. Specifically, the telescopic member 500 is a telescopic hydraulic cylinder or a motorized linear actuator. The end of the telescopic member 500 may be rotatably connected with the building 20 other than the bracket 110. Alternatively, the method to drive rotation of the barrier plate 310 is not limited to using the telescopic member 500, for example, the barrier plate 310 may be rotatably connected with the bracket 110 via a pivot, a stepping motor is arranged on the bracket 110, the stepping motor is connected with the pivot in a transmission way and is used for driving rotation of the barrier plate 310.

The moving method of the barrier plate 310 is not limited to rotating. For example, the barrier plate 310 is capable of moving in vertical direction. When the drone needs to land to the operating area, the barrier plate 310 slides to the position in which the barrier plate 310 is between the building 20 and the operating area, so as to separate the drone and the user.

It can be appreciated that in some other embodiments, the platform 120 cannot rotate. Under such condition, the working surface 122 may keep being horizontally positioned. Besides, when the system 10 does not work with the drone for sending or receiving the goods, the barrier plate 310 may be opened or closed by user, and the door 320 may be omitted.

The lift mechanism 400 is arranged on the platform 120, and is positioned in the operating area. The lift mechanism 400 is capable of supporting the goods and lifting the supported goods up/down.

Specifically, the lift mechanism 400 is electrically connected with the electronic control component 200, and the electronic control component 200 can control the lift mechanism 400 to extend/retract, so as to realize automatic lifting of the lift mechanism 400.

In the illustrated embodiment, the platform 120 is provided with a hollow 124. The hollow is positioned in the operating area to accommodate the lift mechanism 400. The lift mechanism 400 is capable of extending out of from the hollow 124.

Figure 9:
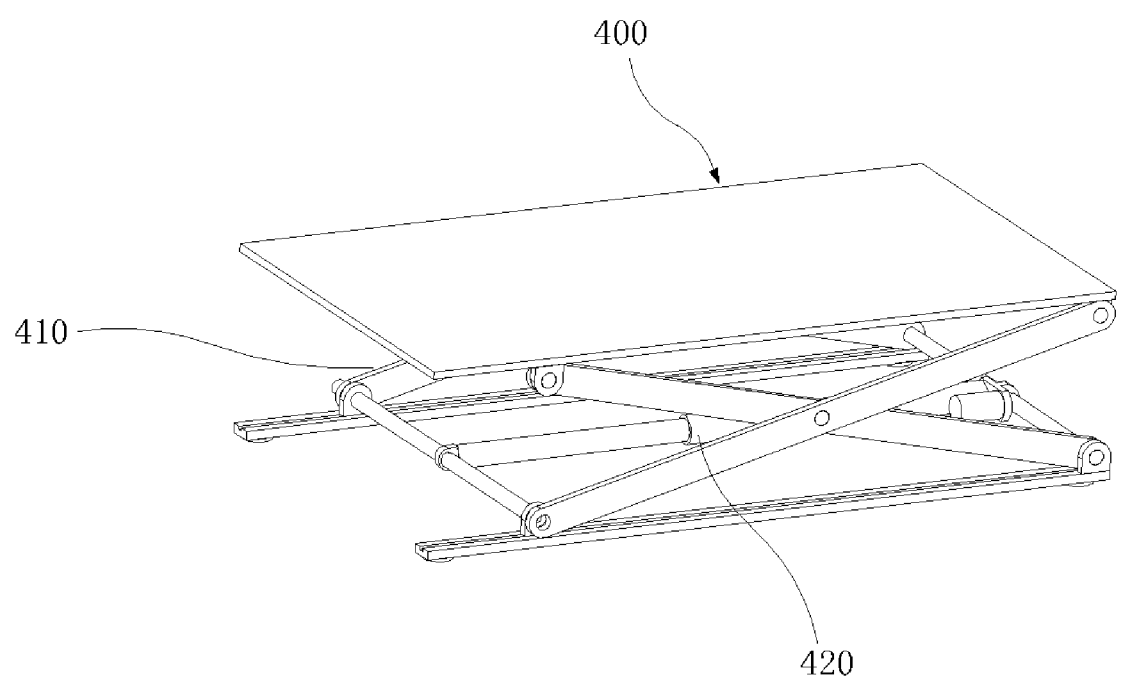
FIG. 9 is a schematic structural diagram illustrating a lift mechanism of the system shown in FIG. 1.

Please refer to FIG. 9, in the illustrated embodiment, the lift mechanism 400 includes a scissors mechanism 410 and a motorized linear actuator 420.

The scissors mechanism 410 is capable of supporting the goods. The motorized linear actuator 420 can drive the scissors mechanism 410 to extend/retract. The motorized linear actuator 420 is electrically connected with the electronic control component 200, so that the electronic control component 200 can control the operation of the motorized linear actuator 420.

In the illustrated embodiment, the system 10 further includes a pressure sensor 600. The pressure sensor 600 is arranged on the lift mechanism 400 and is electrically connected with the electronic control component 200. The pressure sensor 600 can measure weight of load supported by the lift mechanism 400. Furthermore, the electronic control component 200 can control the lift mechanism 400 to lift up or lift down according to the weight of load supported by the lift mechanism 400. For example, after the goods are placed on the lift mechanism 400 or taken away from the lift mechanism 400, the electronic control component 200 controls the lift mechanism 400 to retract.

In the illustrated embodiment, the barrier assembly 300 further includes a sensor 700 electrically connected with the electronic control component 200. The sensor 700 can sense state of the door 320, that is, the sensor 700 can sense whether the door 320 is in opened or closed state. Furthermore, the electronic control component 200 can control the lift mechanism 400 to lift up or lift down according to the state of the door 320, for example, after the user opens the door 320, the sensor 700 senses that the door 320 Is in opened state, so that the electronic control component 200 can control the lift mechanism 400 to extend. Specifically, the sensor 700 can be a contact switch or a proximity switch.

Further, the electronic control component 200 can control the operation of actuator 130 according to the weight of load supported by the lift mechanism 400 and the state of the door 320. For example, when the goods are taken away from the operating area, the weight of load supported by the lift mechanism 400 is turning to zero. Under such condition, if the door 320 is in opened state, the electronic control component 200 control the actuator 130 not to drive the platform 120 rotating; alternatively, if the door 320 is in closed state, the electronic control component 200 control the actuator 130 to drive the platform 120 rotating, making the platform 120 closely approach the building 20.

Further, the barrier assembly 300 includes an alarm 800, which can give an alarm so as to remind user to close the opening 312. The alarm 800 is electrically connected with the electronic control component 200, the electronic control component 200 controls operation of alarm 800 according to the state of the door 320 and timer, the alarm 800 may be optional.

Further, a marker 316 used for drone vision positioning is arranged on the barrier surface 314 or on the working surface 122, so as to facilitate the drone to land accurately to the operating aera of platform 10. The number of the markers 316 may be set as required. When the barrier plate 310 is in the position close to the edge of the horizontal working surface 122, the marker 316 is visible to the drone; when the barrier plate 310 is in the position right above the operating area, the marker 316 is invisible to the drone.

The characteristics and benefits of the apparatus 10 are listed as below:
(1) The barrier plate 310 is movable and is capable of moving to the position in which the barrier plate 310 is between the building 20 and the operating area, enabling the barrier assembly 300 to separate the operating area from the other side of the barrier assembly away from the operating aera, so as to separate drone and user, which help reducing the risk that user and drone contact. Besides, the barrier plate 310 can block part of the noise to spread from drone to the user.
(2) The barrier plate 310 is also capable of moving to the position in which the barrier plate 310 is right above the operating area, enabling the barrier assembly 300 to shelter the operating area, so as to prevent the goods in the operating area from being rained.
(3) The platform 120 is capable of rotating, enabling the platform 120 to closely approach the building 20. When the platform 120 closely approaches the building 20, the barrier plate 310 is also capable of moving to the position in which the barrier plate 310 closely approach the platform 120. As such, when being in standby state, the system 10 can be folded to minimize the size that the system 10 protrude from the building 20, thereby lowering the impact on the system 10 inflicted by strong wind.
(4) The lift mechanism 400 is extendable. When the drone needs to offload the goods, the lift mechanism 400 extends to support the goods, so as to prevent the goods from falling on the platform 120 directly due to drop height, also, the lift mechanism 400 can extend to lift the goods up, facilitating the drone to load the goods, or facilitating the user to pick up the goods.

It can be appreciated that, the bracket 110 may be omitted, in this case, the actuator 130 may be directly arranged on the building 20, that is, the end of the actuator 130 away from the platform 120 may be rotatably connected with the building 20. The lift mechanism 400 may be omitted, in this case, the system 10 cannot lift the goods up/down. Besides, the marker 316 may be optional.

Figure 10:
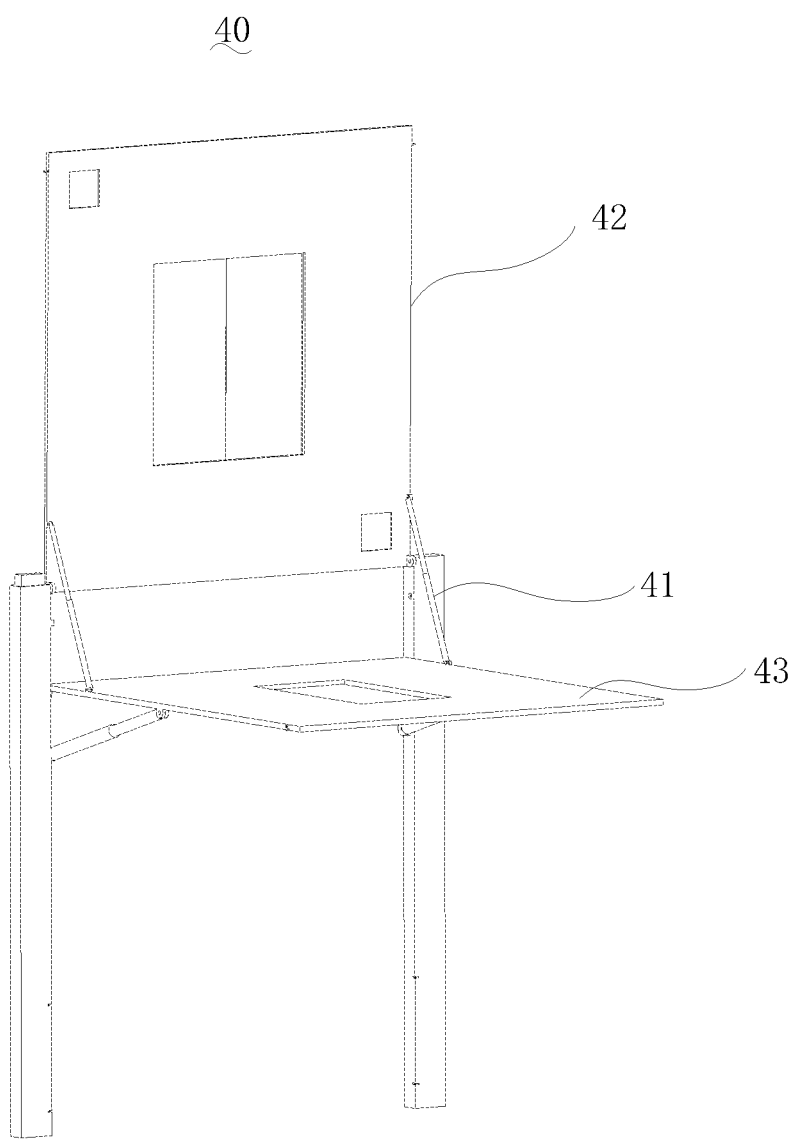
FIG. 10 is a schematic structural diagram of a system, when the system is in fully deployed state, according to another embodiment of the present disclosure.
Figure 11:
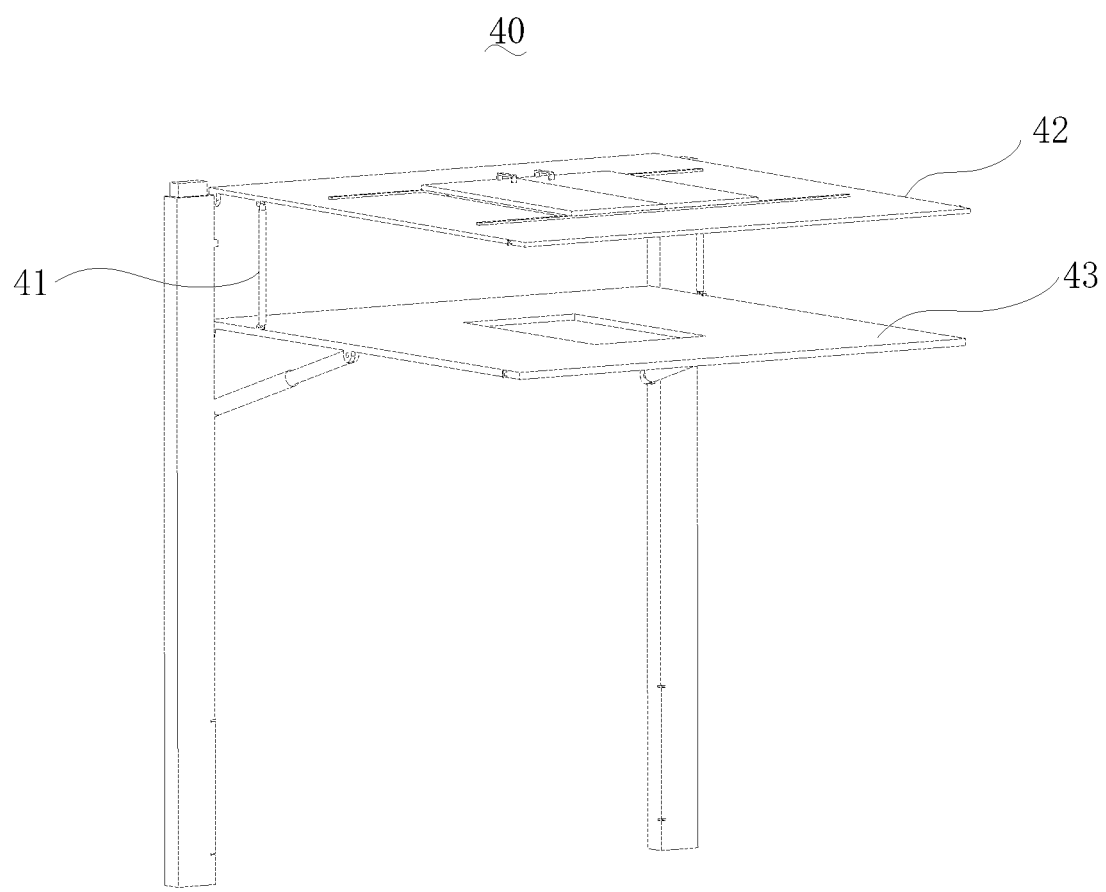
FIG. 11 is a schematic structural diagram of the system shown in FIG. 10, when the system is in semi deployed state.

Please refer to FIG. 10 and FIG. 11, a system 40 for receiving and sending goods delivered by drone according to another embodiment has been presented. The system 40 shown in FIGS. 10 and 11 has a substantially same structure as that of the system 10, except that the end of the actuator 41 away from the barrier plate 42 is rotatably connected with the platform 43.

As the system 40 has substantially same structure as the system 10, the system 40 has the same characteristics and benefits of the system 10.

Figure 12:
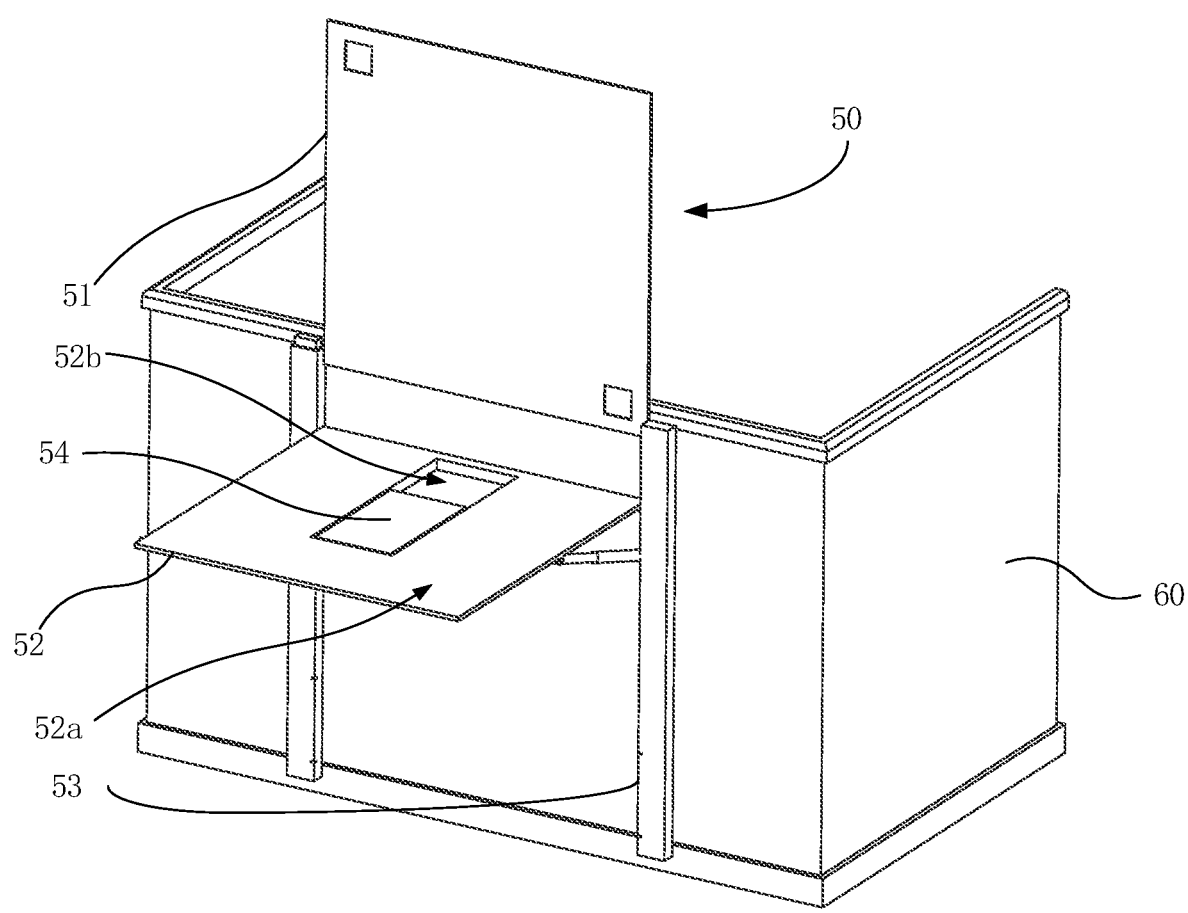
FIG. 12 is a schematic structural diagram of a system, when the system is in fully deployed state, according to another embodiment of the present disclosure.

Please refer to FIG. 12, a system 50 for receiving and sending parcel delivered by drone according to another more embodiment has been presented. The apparatus shown in FIG. 12 has substantially same structure as that of the system 10, except on the structure and motion mechanism of the barrier assembly. In this embodiment, the barrier assembly includes a barrier plate 51 that can slide in vertical direction. Specifically, the barrier plate 51 is slidably arranged on the bracket 53. And the barrier plate 51 is arranged close to the edge of the working surface 52a when the working surface 52a is horizontal.

The barrier plate 51 can slide upward to a position, in which the barrier plate 51 separates the operating area of the working surface 52a from the other side of the barrier plate 51 away from the operating area. When the drone lands to the operating area, the barrier plate 51 separates the operating area from the other side of the barrier plate 51 away from the operating area, and the height of the portion of the barrier plate 51 above the working surface 52a is greater than the distance from the rotor of the drone to the working surface 52a, in order to separate drone and user. There is no need to arrange the access opening in the barrier plate 51 and to arrange the door on the barrier plate 51.

Figure 13:
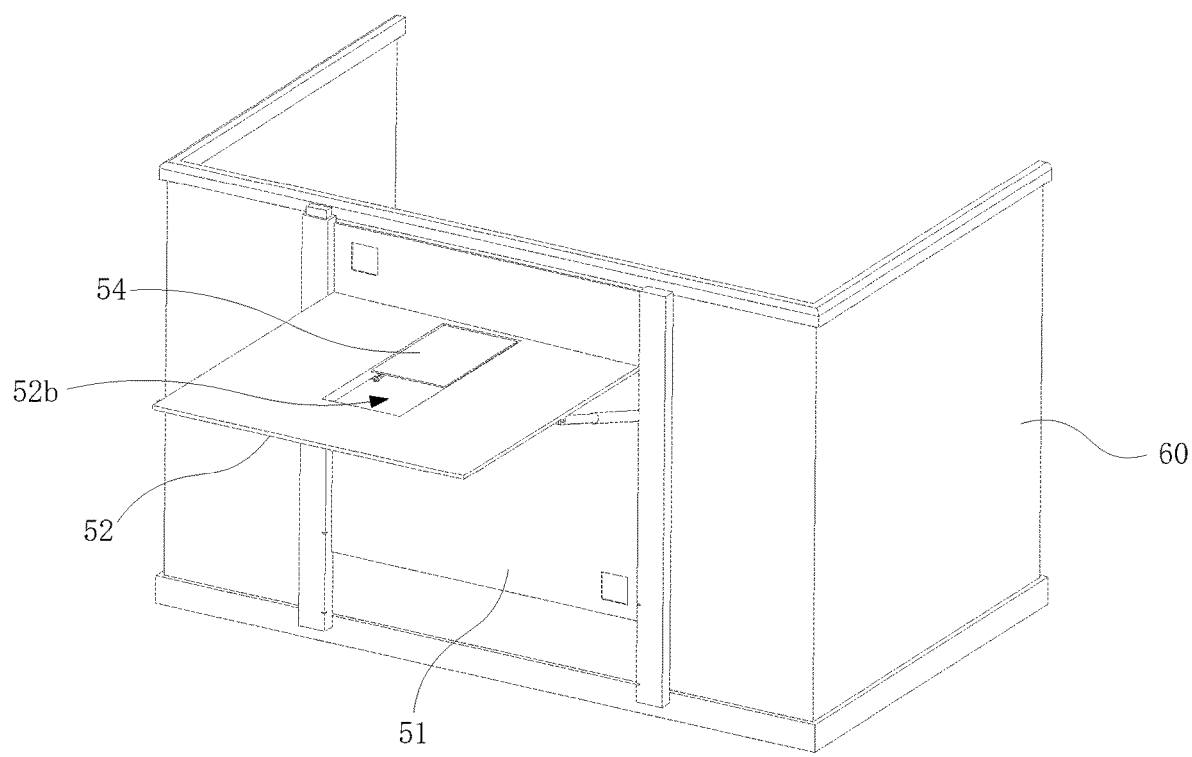
FIG. 13 is a schematic structural diagram of the system shown in FIG. 12, when the system is ready for user to pick up goods.

As shown in FIG. 13, the barrier plate 51 also can slide downward to another position, allowing user to pick up the goods.

Further, compared with the lift mechanism 400 in the above-mentioned embodiment, the lift mechanism 54 can slide towards the barrier plate 51 before user picks up the goods. The platform 52 is provided with a hollow 52b extending from the operating area to approach the barrier plate 51. The lift mechanism 54 is arranged in the hollow 52b and can slide along the extension direction of the hollow 52b, so that the lift mechanism 54 is capable of lifting the goods up/down and is also capable of sliding with the goods.

Figure 14:
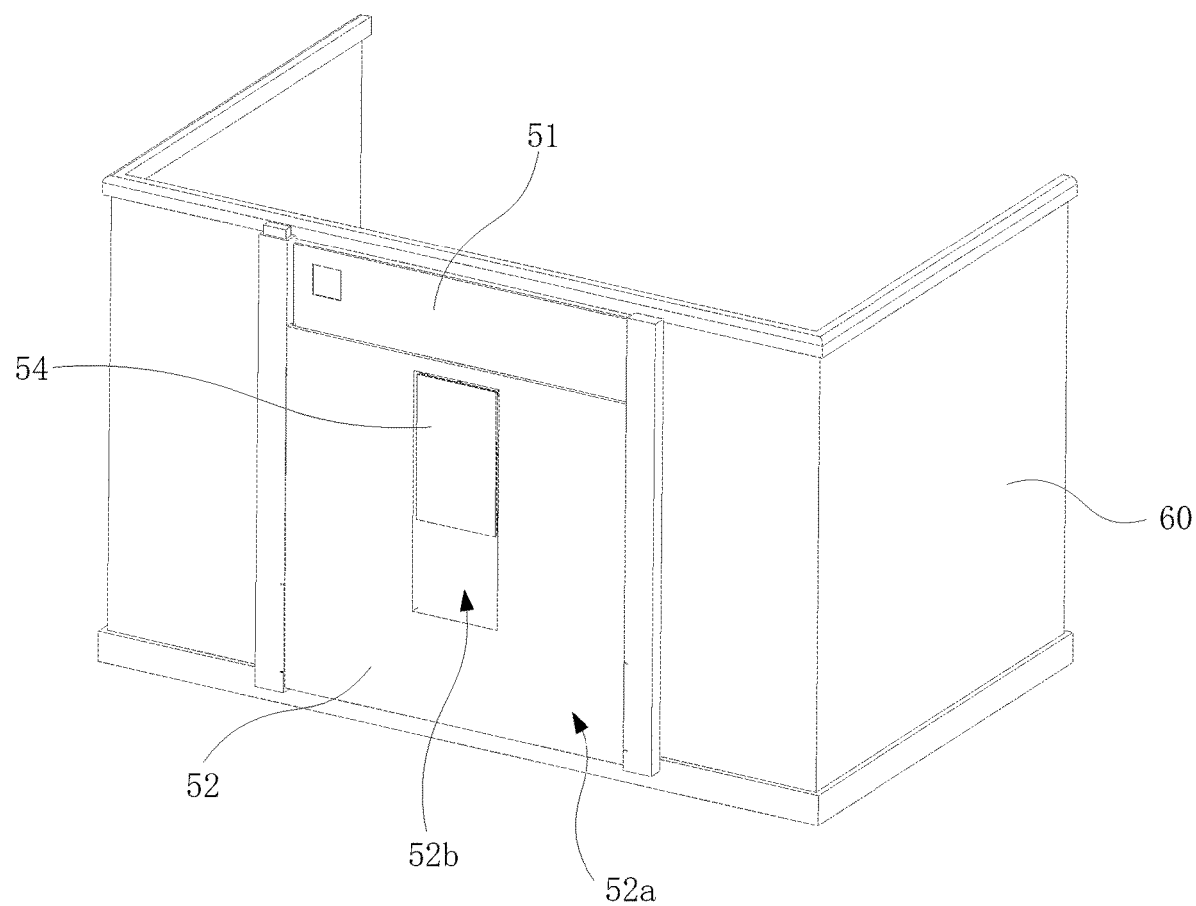
FIG. 14 is a schematic structural diagram of the system shown in FIG. 12, when the system is in folded state.

Further, after user picks up the goods, the platform 52 rotates to make the working surface 52 vertical or tilted, allowing the platform 52 to closely approach the barrier plate 51, and the barrier plate 51 is positioned between the platform 52 and the building 60, that is, the system 40 is in folded state as shown in FIG. 14.

The technical features of the above-mentioned embodiments can be combined. In order to simplify the description, not all possible combinations of the technical features of the above-mentioned embodiments have been provided. It can be appreciated that, as long as no contradiction is concluded from these combinations, all reasonable combinations of the features should be considered as the scope recorded in the description.

The present disclosure mainly presents several embodiments with their descriptions more specific and detailed than others, but they should not be construed as limiting the scope of the present disclosure. It should be noted that for those skilled in the art, several modifications and improvements can be made without departing from the conception of the present disclosure, which shall all fall within the scope of the present disclosure. Therefore, the scope of the present disclosure shall be subject to the appended claims.

What is claimed is:

1. A system for receiving and sending goods delivered by drone, comprising:
a base assembly, wherein the base assembly comprises a platform capable of being arranged on a building, the platform is provided with a working surface, an operating area used for a drone to land and for goods to be placed is arranged on the working surface;
a barrier assembly, wherein the barrier assembly comprises a movable barrier plate; when the drone needs to land to the operating area, the barrier plate moves to a first position between the building and the operating area, enabling the barrier assembly to separate the drone and a user, and wherein the barrier plate is capable of moving to the first position, in which at least part of the barrier plate is above the working surface, allowing the drone to land to the operating area; and wherein the barrier plate is also capable of moving to a second position right above the operating area, in which the barrier plate is opposite to and is spaced from the working surface, enabling the barrier assembly to shelter the operating area and to prevent the drone from landing to the operating area.

2. The system of claim 1, wherein
an access opening is formed in the barrier plate, allowing the user to pick up or place the goods; and
the barrier assembly further comprises a door to block the access opening
the barrier plate and the door can jointly separate the operating area from the other side of the barrier plate away from the operating area.

3. The system of claim 2, further comprising an electronic control component, wherein
the barrier plate is provided with an electric lock;
the electronic control component is electrically connected with the electric lock, and is capable of controlling the electric lock to unlock the door, so that the user can open the door.

4. The system of claim 1, wherein
the barrier plate is capable of rotating to the first position and to the second position;
the base assembly further comprises a bracket capable of being mounted on the building, the platform is arranged on the bracket;
one end of the barrier plate is a connecting end, and the other end of the barrier plate is a free end, the connecting end of the barrier plate is rotatably connected with the bracket; by rotation of the barrier plate, the free end can be positioned higher than the connecting end, enabling the barrier assembly to separate the operating area from the other side of the barrier plate away from the operating area.

5. The system of claim 2, wherein
the barrier plate is capable of rotating to the first position and to the second position;
the base assembly further comprises a bracket capable of being mounted on the building, the platform is arranged on the bracket;
one end of the barrier plate is a connecting end, and the other end of the barrier plate is a free end, the connecting end of the barrier plate is rotatably connected with the bracket; by rotation of the barrier plate, the free end can be positioned higher than the connecting end, enabling the barrier assembly to separate the operating area from the other side of the barrier plate away from the operating area.

6. The system of claim 1, wherein
the platform is capable of rotating to a position, in which the working surface is horizontal, so that the operating area can serve for the drone to land and for the goods to be placed;
the platform is capable of rotating to another position, in which the working surface is vertical or tilted, allowing the platform to closely approach the building;
in horizontal state of the working surface, the barrier plate is capable of moving to the first position and to the second position; and
in vertical or tilted state of the working surface, the barrier plate is capable of moving to a third position, in which the barrier plate closely approaches the platform, resulting in the platform being between the barrier plate and the building.

7. The system of claim 2, wherein
the platform is capable of rotating to a position, in which the working surface is horizontal, so that the operating area can serve for the drone to land and for the goods to be placed;
the platform is capable of rotating to another position, in which the working surface is vertical or tilted, allowing the platform to closely approach the building;
in horizontal state of the working surface, the barrier plate is capable of moving to the first position and to the second position; and
in vertical or tilted state of the working surface, the barrier plate is capable of moving to a third position, in which the barrier plate closely approaches the platform, resulting in the platform being between the barrier plate and the building.

8. The system of claim 1, further comprising a lift mechanism arranged in the operating area of the platform, wherein
the lift mechanism is capable of supporting the goods and lifting the supported goods up or down, facilitating the drone to load the goods, or facilitating the user to pick up the goods.

9. The system of claim 8, wherein
the lift mechanism is also capable of sliding towards the barrier plate.

10. The system of claim 8, further comprising:
an electronic control component, and
a pressure sensor arranged on the lift mechanism and electrically connected with the electronic control component, wherein
the pressure sensor is configured to measure a weight of load supported by the lift mechanism;
the electronic control component is capable of controlling the lift mechanism to lift up or lift down according to the weight of load supported by the lift mechanism.

11. The system of claim 1, wherein
the system is provided to be arranged on exterior side of a balcony railing or below a windowsill; and/or
when the barrier plate is in the second position, the barrier assembly can prevent the goods in the operating area from being rained.

12. The system of claim 4, wherein
one end of the platform is rotatably connected with the bracket
the free end of the barrier plate is provided with a snap, the bracket is provided with a clamp;
the barrier plate rotates to make the connecting end higher than the free end, thus enabling the clamp and the snap to snap fit, so as to stop the barrier plate from rotating, in this case, the barrier plate can also prevent the platform from rotating away from the building.

13. The system of claim 1, further comprising an electronic control component, wherein
the electronic control component is capable of controlling the barrier plate to move to the first position according to signal sent by the drone.

14. The system of claim 1, further comprising a telescopic member, wherein
one end of the telescopic member is rotatably connected with middle of the barrier plate, and the other end of the telescopic member is rotatably connected with the platform, the telescopic member is extendable so as to drive the barrier plate to rotate.

15. The system of claim 1, wherein
a marker for vision positioning of the drone is arranged on a barrier surface of the barrier plate or is arranged on the working surface of the platform;
the marker switches between being visible or invisible to the drone by movement of the barrier plate.

16. The system of claim 1, wherein
a marker for vision positioning of the drone is arranged on a barrier surface of the barrier plate or is arranged on the working surface of the platform;
the marker switches to being visible to the drone when the barrier plate is in the first position; and
the marker switches to being invisible to the drone when the barrier plate is in the second position.

17. The system of claim 2, wherein
a marker for vision positioning of the drone is arranged on a barrier surface of the barrier plate or is arranged on working surface of the platform;
the marker switches to being visible to the drone when the barrier plate is in the first position; and
the marker switches to being invisible to the drone when the barrier plate is in the second position.

18. The system of claim 13, wherein
the electronic control component can transmit feedback signal to the drone, so that the drone can land, offload/load the goods according to the feedback signal received; and/or
the electronic control component can transmit feedback signal to a UE, so that the user can place the goods according to the feedback signal received.

19. An operation method for the system of claim 1, comprising:
before the drone lands to the operating area, the barrier plate automatically moves to the first position, enabling the barrier assembly to separate the operating area from the other side of the barrier plate away from the operating area;
after the drone offloads the goods and flies away from the operating area, or before the user places goods in the operating area, the barrier plate automatically moves to the second position, so that the user can pick up or place the goods.

20. A system for receiving and sending goods delivered by drone, comprising:
a base assembly, wherein the base assembly comprises a platform capable of being arranged on a building, the platform is provided with a working surface, an operating area used for a drone to land and for goods to be placed is arranged on the working surface;
a barrier assembly, wherein the barrier assembly comprises a movable barrier plate; when the drone needs to land to the operating area, the barrier plate moves to a first position between the building and the operating area, enabling the barrier assembly to separate the drone and a user; the barrier plate is arranged close to the edge of the working surface; and
wherein the barrier plate is capable of sliding upward to the first position, in which the barrier plate separates the operating area from the other side of the barrier plate away from the operating area; and wherein the barrier plate is also capable of sliding downward to a second position, allowing the user to pick up the goods; and
wherein the platform is capable of rotating to a position, in which the working surface is horizontal, so that the operating area can serve for the drone to land and for the goods to be placed; and
wherein the platform is capable of rotating to another position, in which the working surface is vertical or tilted, allowing the platform to closely approach the barrier plate in the second position.

* * * * *